United States Patent Office 2,810,478
Patented Oct. 22, 1957

2,810,478

EXTRUSION OF HOLLOW BODIES

Jacques Sejournet, Paris, and Jean Buffet, Beaumont-sur-Oise, France, assignors to Societe Anonyme Dite: Comptoir Industriel d'Etirage et Profilage de Metaux, Paris, France, a corporation of France Application April 16, 1953, Serial No. 349,197

Claims priority, application France April 18, 1952

1 Claim. (Cl. 207—9)

The present invention relates to the extrusion, by means of a press, of hollow bodies of any dimensions, from a metal block of any nature.

It is already known to manufacture hollow bodies from metal blanks, particularly by means of the extrusion methods known as "impact extrusion" and "Hooker process."

These methods are based on the phenomenon according to which a metal which is compressed, inside a cylindrical container by means of a ram the outer dimensions of which are smaller than the inner dimensions of the container, flows back parallel with the axis of the said ram. However, they can be used only with metals or alloys which are capable of being deformed easily such as aluminium and its alloys, tin, copper, and brass.

According to the Hooker process, metal blanks are extruded at high speeds by means of mechanical presses, instead of hydraulic presses commonly used in extruding operations. This type of extrusion differs from the normal extrusion of metals by the two following essential features:

The metal is introduced into the press at room temperature and there is no important increase of the temperature during operations. The products obtained are cold drawn and their properties are related to this quality;

The operations are carried out at a high speed and on relatively small amounts of metal.

This method is generally suitable for the manufacture of small tubular articles made out of copper, brass or aluminum. It is particularly suitable when a large number of parts are to be manufactured with the same dimensions, for instance brass cartridge shells of 70% Cu, 30% Sn.

Scarcely any tubes having a diameter larger than 12 mm. are manufactured by means of this method.

In such a case, impact extrusion has been used heretofore. A die or container having a solid base is used, in which a flat metal ingot is placed. The compressing ram is straight and the compressed metal flows along the ram, parallel with the axis of said ram.

This process may be conveniently used, for manufacturing objects each having a large length as compared with its diameter. It is used for the manufacture of aluminum articles which generally require additional forming operations.

The outer diameter of the objects thus manufactured may be as much as 100 mm.

This process has found an important application in the manufacture of flexible tubes, such as tubes for tooth pastes, colors, condensed milk, made of tin, lead or tin-lead alloys.

Generally speaking, known methods make it possible to work rapidly, without requiring any particular deviation from ordinary temperature, only metals which are relatively easy to deform, for producing hollow bodies of limited dimensions.

Whenever an attempt is made to increase the dimensions of the extruded products or to work with harder metals, such as steel, one finds a substantial increase in the power required and it becomes impossible to find sufficiently resistant steels for making the tools.

It has been attempted to obviate these difficulties by a preliminary heating of the metal to be transformed but it was then found that the tools were subjected to a prohibitive wear.

The object of the present invention is to provide a method for the manufacture of hollow bodies out of metals of any nature whatsoever, with small or large dimensions, without the above mentioned drawbacks.

According to the invention, hollow bodies are hot pressed from a disc or blank of the metal to be transformed, by heating the said metal to make it more malleable, coating it, at least partly, with a vitreous material capable of assuming a viscous condition at the working temperature, introducing it into a container closed at one end, and compressing it by means of a ram so as to cause the metal to flow parallel with the axis of said ram.

It has been found that, when operating according to the invention, the compressed metal flows in a direction exactly opposite to the direction of compression, the metal thus moving upwards along the ram even in case the inside shape of the container is not cylindrical. The container may thus assume any desirable inner shape except those which are not compatible with an upward flow of the metal.

By suitably selecting the shape of the container, it is possible to obtain, after the compressing operation, a formed part having a constant inner diameter, the shape of the outer surface being known beforehand.

One may, for instance, use a container hollowed out to a funnel shape, or a frusto-conical container, which results in the production of hollow bodies having a constant inner diameter, while the outer diameter decreases from the open end to the closed end.

The main result provided by the present method is the obtention of a regular deformation of the metal, even of steels which are most resistant to deformation, by means of operations of heating and compression in the presence of a vitreous material. The combined actions of these two means makes it possible to obtain remarkable results both as to the variety of the metals which can be used and as to the wide range of dimensions of the manufactured hollow bodies and of their shapes, as well as to the ease with which the deformation process takes place. The vitreous material is both an insulating material and a lubricant at the working temperature.

In carrying out the method according to the invention the vitreous material is advantageously placed in the bottom of the container which is substantially vertical. The heated metal blank is then introduced and vitreous material is further placed between the said blank and the ram, before the compressing operation.

Experience has shown that the vitreous materials may be used either as solid bodies previously shaped to conform to the blank or the tools and of small thickness, or in the state of powder or fibres.

In a general manner, it is preferable to select materials which do not chemically attack the metal to be transformed and have good wetting power.

Numerous compositions may be recommended. They give good results when their viscosity $\eta$, expressed in poises, is such that $1 < \log_{10} \eta < 2.5$ at the temperature of operation. It is furthermore advantageous, that the variation of viscosity in the vicinity of the temperature of operation be low.

Thus, for instance, ordinary window glass and the various metallurgy slags give good results for the transformation of steels at 1220° C.

A glass composition is given hereinunder by way of example which is recommended for transformation temperatures between 1150 and 1330° C.:

| | Percent |
|---|---|
| $SiO_2$ | 61.5 |
| $B_2O_3$ | 1.1 |
| $Al_2O_3 + Fe_2O_3$ | 4.2 |
| CaO | 14 |
| MgO | 4 |
| $Na_2O$ | 14 |
| Miscellaneous | 1.2 |

When operating according to the invention, it is unnecessary to operate rapidly and suddenly as for instance in the case of the impact method.

The hollow bodies obtained have inner and outer surfaces which are smooth and faultless; expansion is the same over the entire periphery of the object; the tools heat little, their wear is negligible and the power required for the deformation is considerably decreased.

A particular embodiment of the method according to the invention is described hereafter, with reference to the appended drawings in which.

Figure 1:
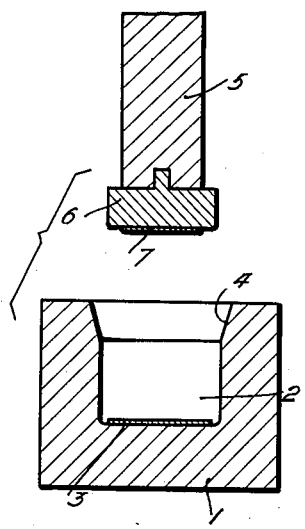
Figure 1 is a diagrammatic sectional view of a die or container closed at its base and of a corresponding ram, showing the places coated with vitreous material.
Figure 2:
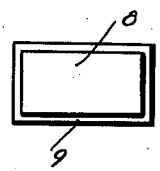
Figure 2 is a sectional view of a metal blank coated with vitreous material.
Figure 3:
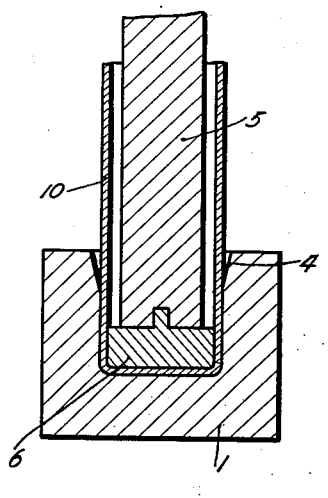
Figure 3 is a sectional view showing the die, the ram and the shaped part at the end of the operation.

Referring to Figures 1 to 3, the die container 1 has a cylindrical inner boring 2. On the bottom of this bore is a layer 3 of vitreous material, for instance a glass with the above indicated composition. The bore 2 is provided, at its upper part, with a flared portion 4 allowing an easier stripping of the metal.

The ram 5 is provided with dummy block 6 on the front face of which is placed a layer 7 of vitreous material.

The heated metal part to be transformed, or blank 8, is also coated with vitreous material 9.

The part 8, thus prepared, is introduced into the die 1 and the ram is applied against the blank, by a gradual compression. A perfectly cylindrical hollow body 10 is thus obtained.

Figure 4:
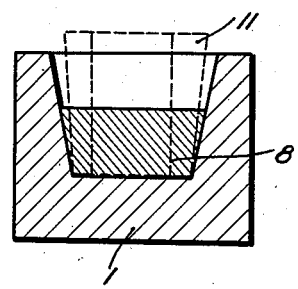
Figure 4 is a sectional view of a die with a frusto-conical inner shape.

Figure 4 shows a blank 8 of metal to be transformed, having a frusto-conical shape, substantially the same as the inner surface of the die 1. There is shown, in broken lines, the hollow formed part 11 obtained by using a die of such a shape, the ram used being the same as the one shown in Figure 1, but without the dummy block 6.

A carbon steel billet 112 mm. in diameter and 100 mm. long was shaped in the following manner:

A cylindrical container 114 mm. in diameter was preheated to about 500° C. The billet, previously heated in a salt bath at 1300° C., was wrapped in a glass cloth, introduced in the container and compressed by means of a ram provided at its end with a dummy block 104 mm. in diameter.

Before the shaping, a glass plate was introduced between the front face of the dummy block and the billet.

This operation required a pressure of 38 kg. per sq. mm. corresponding to a 300 ton stress. The metal of the billet flowed back along the ram over a length of about 300 mm.

A cylindrical hollow body about 104 mm. in inner diameter and 300 mm. long was thus obtained.

What we claim is:

A method of making a hollow steel body, which comprises heating a frusto-conical steel block having a narrower end and a wider end to a temperature suitable for extruding it, introducing the heated block in a container having a cavity closed at one end and flaring in the direction opposite to that of said closed end, the narrower end of the block being placed against said closed end, placing between the block and the closed end of the container and between a ram entering the other end of the container and the block a layer of vitreous material capable of assuming a viscous condition at extrusion temperature, and forcing the ram into the steel block to cause the steel to flow backward between the container and ram to form a formed part having a constant inner diameter but an outer diameter which decreases from the open end to the closed end.

References Cited in the file of this patent

UNITED STATES PATENTS

| 590,130 | Bungeroth | Sept. 14, 1897 |
|---|---|---|
| 1,444,270 | Pinchart et al. | Feb. 6, 1923 |
| 1,702,278 | Simons | Feb. 19, 1929 |
| 1,848,083 | Wetherald | Mar. 1, 1932 |
| 2,128,705 | Hatebur | Aug. 30, 1938 |
| 2,207,004 | Gruber et al. | July 9, 1940 |
| 2,244,954 | Lenz et al. | June 10, 1941 |
| 2,483,376 | Temple | Sept. 27, 1949 |
| 2,538,917 | Sejournet et al. | Jan. 23, 1951 |
| 2,630,220 | Sejournet | Mar. 3, 1953 |
| 2,668,345 | Eckstein | Feb. 9, 1954 |
| 2,756,494 | Sejournet | July 31, 1956 |

FOREIGN PATENTS

| 21,052 | Great Britain | 1900 |
|---|---|---|
| 234,397 | Switzerland | Jan. 16, 1945 |
| 420,791 | Italy | 1947 |
| 479,483 | Canada | Dec. 18, 1951 |
| 607,285 | Great Britain | Aug. 27, 1948 |
| 667,985 | Great Britain | Mar. 12, 1952 |
| 1,043,869 | France | June 17, 1953 |

OTHER REFERENCES

"Machinery," pp. 139–147, July 1945.
"The Iron Age," pp. 90–105, August 4, 1949.